UNITED STATES PATENT OFFICE.

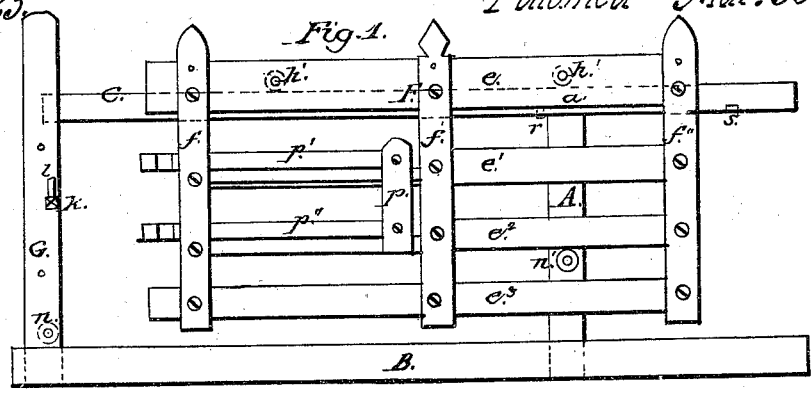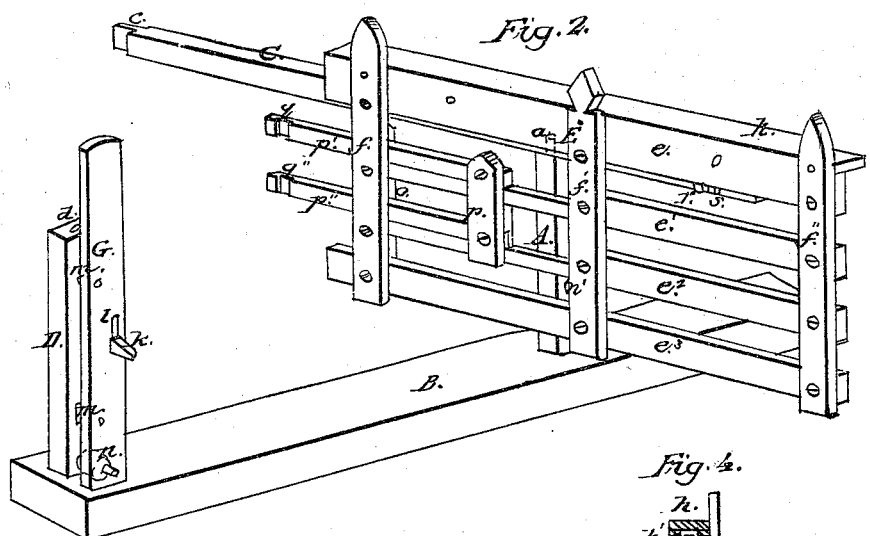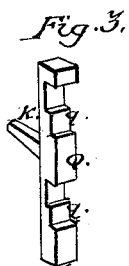

ALMON T. MORRIS, OF SEAL, OHIO.

Letters Patent No. 88,323, dated March 30, 1869.

IMPROVEMENT IN FARM-GATES.

The Schedule referred to in these Letters Patent and making part of the same.

*To all whom it may concern:*

Be it known that I, ALMON T. MORRIS, of Seal, in the county of Wyandot, and State of Ohio, have invented certain new and useful Improvements in Farm-Gates; and that the following is a full, clear, and exact description of the same, reference being had to the accompanying drawings, making a part of this specification, in which—

Figure 1 represents a front view of the gate partly open, for the passage of small animals.

Figure 2 represents a perspective view of the gate entirely open.

Figure 3 represents a detached view of the latch.

Figure 4 represents a cross-section through the gate.

Similar letters of reference, where they occur in the drawings, denote like parts in all the figures.

My invention relates to the arrangement, in connection with a gate that reciprocates, or slides on a rail, and then swings around with said rail upon a pivot-pin, of a sliding panel in said gate, with a separate fastening, so that a passage may be made for very small, or for larger stock, or for teams, as the case may be, or all of them be closed when necessary.

To enable others skilled in the art to make and use my invention, I will proceed to describe the same with reference to the drawings.

A represents the back post, which is attached to the sill B, if a sill is used; otherwise it is set firmly in the ground, in an upright position.

This post has projecting upward from its top, a pin, $a$, which enters a hole bored in the under part of the cross-bar C, allowing the latter to pivot round it.

The forward end of this bar is cut in the form of a tenon, at $c$, which rests in the mortise $d$, cut in the top of the forward post D, when the gate E is either partly or entirely closed, thus allowing the latter a steady bearing, on which the gate can run.

The gate itself is made of horizontal slats, or boards, $e$ $e^1$ $e^2$ $e^3$, connected firmly together by means of the uprights $f$ $f'$ $f''$. The upper board, $e$, is wider than the others, and forms one side of the inverted trough which embraces the cross-bar C, this trough being composed of the board $e$, and parallel to it the board $g$, connected to the former by the top board $h$.

Through the side-boards $e$ and $g$ pass pins, around which the rollers $h'$ can revolve in carrying the gate E along the cross-bar C.

In front of the post D, and about one and one-half inch from it, if the gate is made of inch boards, stands the facing-board G, which carries the upright latch Q, and through which passes the handle $k$, by means of the slot $l$. This facing-board G is attached to the post D, and held in proper position by the pins and parting-piece $m$.

In the bottom of the space between the post D and facing-piece G, is a roller, $n$, to support one end of the gate when it is closed, and relieve the bar C from its weight, the other end of the gate being similarly supported by the roller $n'$, attached to the post A.

The slat $e^2$, being made deeper at its after-end, slightly raises the gate off the bar C, relieving the latter from all the weight.

To make the gate so as to be able to divide different classes of animals, I reduce the forward end of the slats $e^1$ $e^2$ to about half their width, making up the width by two sliding bars, $p'$ $p''$, connected together by the short upright, $p$.

These bars are retained in position by the backing-piece of the upright, $p$, which is cut of a V-shape at its upper part, and embraces the lower side of the board $e^1$, and also by the slotted piece $o$, attached to the upright, $f$, serving as a guide for the slats $p'$ $p''$ to slide in and out of the gate.

There are notches, $q'$ $q''$, cut near the forward end of these slats, to receive the projections $q$ of the latch Q, when the latter fastens the gate.

From the under side of the board $e$ projects a pin, $r$, for the purpose of keeping the gate from going off the cross-bar C when the gate is open. The pin $r$, striking against the pin $s$ projecting from the side of the cross-bar C, stops the backward motion of the gate at the time that it is balanced on the top of the post A.

Supposing the gate to be closed, and that it is intended to pass through with a team, the operation is as follows:

The latch Q (which acts by friction) is pressed down, releasing the slats $p'$ $p''$, when the whole gate E is rolled along the cross-bar C till the pin $r$ strikes the pin $s$, when it will be found that the gate is balanced on top of the post A, being retained there by its pivot $a$, when, by lifting the tenon $c$, forming the end of the cross-bar C, out of the mortise $d$, on top of the post D, the cross-bar C, and with it the gate E, is free to revolve round the post A, for the team to pass. To close the gate, the reverse operation is performed.

But when it is intended to open a passage for small animals only, the gate E is rolled partly out of the way, at the same time that the slats $p'$ $p''$ are held by the latch Q, thus closing most of the gateway, and leaving an opening under the slats $p'$ $p''$ only.

As the gate E is not fastened to the posts, it can be taken off the entrance of a field, if required, and used for another entrance, thus making it a portable gate, which can be made easily, and at little cost.

Having thus fully described my invention,

What I claim therein as new, and desire to secure by Letters Patent, is—

The arrangement, in connection with a gate that slides on a rail, and then swings around with said rail upon a pivot-pin, of a sliding panel in said gate, with its own fastening, so that a passage may be made for small or for large stock to go through, or for teams, as may be desired, and as set forth and described.

ALMON T. MORRIS.

Witnesses:
C. F. KELLER,
JOHN SHEEHY.